United States Patent
Nomula (10) Patent No.: US 12,450,631 B2
(45) Date of Patent: Oct. 21, 2025

(54) ADVANCED TECHNIQUES TO IMPROVE CONTENT PRESENTATION EXPERIENCES FOR BUSINESSES AND USERS

(71) Applicant: VOICEMONK INC., Cupertino, CA (US)

(72) Inventor: Jagadeshwar Nomula, Fremont, CA (US)

(73) Assignee: Voicemonk Inc, Sunnyvale, CA (US)

( * ) Notice: Subject to any disclaimer, the term of this patent is extended or adjusted under 35 U.S.C. 154(b) by 324 days.

(21) Appl. No.: 16/006,850

(22) Filed: Jun. 13, 2018

(65) Prior Publication Data
US 2019/0139092 A1    May 9, 2019

Related U.S. Application Data

(63) Continuation-in-part of application No. 15/391,837, filed on Dec. 27, 2016, now abandoned, and a
(Continued)

(51) Int. Cl.
*G06Q 30/0251* (2023.01)
*G06Q 30/0241* (2023.01)
(Continued)

(52) U.S. Cl.
CPC ..... *G06Q 30/0269* (2013.01); *G06Q 30/0255* (2013.01); *G06Q 30/0277* (2013.01);
(Continued)

(58) Field of Classification Search
CPC ....... H04L 67/306; H04L 41/22; H04L 67/02; H04L 67/22; G06Q 30/0269; G06Q 30/02;
(Continued)

(56) References Cited

U.S. PATENT DOCUMENTS 5,361,201 A * 11/1994 Jost .................. G06Q 40/02
705/35
5,737,395 A * 4/1998 Iribarren ............ H04L 51/56
379/88.13
(Continued)

OTHER PUBLICATIONS

J. Johnson et al. To Whom, When, and How Much to Discount? A Constrained Optimization of Customized Temporal Discounts. Journal of Retailing. Dec. 2013. [retrieved from internet on Feb. 23, 2022]. <URL: https://www.sciencedirect.com/science/article/pii/S002243591300064X> (Year: 2013).*

(Continued)

*Primary Examiner* — Bion A Shelden (57) ABSTRACT

A system for generating search tokens for a user is provided. The system comprises a server, wherein the server comprises one or more processors. The server is operable to receive and store one or more user information in a user database. Further, the server identifies one or more of profiles or accounts of the user on one or more digital platforms. The server then collects, and stores one or more information related to one or more activities of the user on the digital platforms and in external systems, in the user database. The server then builds a user profile vector to characterize the user's behavior. Further, the server processes the user profile vector with the help of a learning module in order to derive one or more search tokens. Subsequently, the server may rank the search tokens to identify one or more content that is of interest to the user.

18 Claims, 7 Drawing Sheets

Related U.S. Application Data continuation-in-part of application No. 15/356,512, filed on Nov. 18, 2016, now Pat. No. 11,068,954, and a continuation-in-part of application No. 15/245,208, filed on Aug. 24, 2016, and a continuation-in-part of application No. 13/208,338, filed on Aug. 12, 2011, now abandoned, and a continuation-in-part of application No. 13/089,772, filed on Apr. 19, 2011, now abandoned.

(60) Provisional application No. 62/543,400, filed on Aug. 10, 2017, provisional application No. 62/318,762, filed on Apr. 5, 2016, provisional application No. 62/275,043, filed on Jan. 5, 2016, provisional application No. 62/257,722, filed on Nov. 20, 2015, provisional application No. 61/400,663, filed on Aug. 2, 2010.

(51) Int. Cl.
*G06Q 50/00* (2024.01)
*H04L 67/306* (2022.01)
*H04L 67/50* (2022.01)
*H04W 4/21* (2018.01)
*H04W 4/23* (2018.01)

(52) U.S. Cl.
CPC .......... *G06Q 50/01* (2013.01); *H04L 67/306* (2013.01); *H04L 67/535* (2022.05); *H04W 4/21* (2018.02); *H04W 4/23* (2018.02)

(58) Field of Classification Search
CPC .......... G06Q 30/0255; G06Q 30/0277; G06Q 50/01; H04W 4/23; H04W 4/21; G06F 16/958; G06F 16/9558; G06F 16/9535
See application file for complete search history.

(56) References Cited

U.S. PATENT DOCUMENTS

| | | | |
|---|---|---|---|
| 7,457,397 B1 | 11/2008 | Saylor et al. | |
| 7,979,415 B2 * | 7/2011 | Shen | G06Q 30/0241 707/706 |
| 8,095,419 B1 | 1/2012 | Kapur | |
| 8,239,206 B1 | 8/2012 | LeBeau et al. | |
| 8,429,148 B1 | 4/2013 | Douglas et al. | |
| 8,886,625 B1 | 11/2014 | Dorner et al. | |
| 9,292,252 B2 | 3/2016 | Hardy et al. | |
| 10,304,458 B1 | 5/2019 | Woo | |
| 2001/0032140 A1 | 10/2001 | Hoffman | |
| 2006/0116926 A1 * | 6/2006 | Chen | G06Q 30/0273 705/14.69 |
| 2006/0253328 A1 * | 11/2006 | Kohli | G06Q 30/02 705/14.66 |
| 2007/0060114 A1 | 3/2007 | Ramer et al. | |
| 2007/0094042 A1 * | 4/2007 | Ramer | G06Q 30/0254 705/1.1 |
| 2007/0100650 A1 * | 5/2007 | Ramer | G06F 16/68 705/26.1 |
| 2007/0156757 A1 * | 7/2007 | Tang | G06Q 30/0241 |
| 2007/0185855 A1 * | 8/2007 | Shah | G06F 16/9535 707/999.005 |
| 2008/0189179 A1 * | 8/2008 | Marouani | G06Q 30/02 705/14.54 |
| 2008/0189188 A1 | 8/2008 | Morgenstern | |
| 2008/0215428 A1 | 9/2008 | Ramer et al. | |
| 2008/0275762 A1 * | 11/2008 | Cutler | G06Q 30/02 709/206 |
| 2008/0294621 A1 | 11/2008 | Kanigsberg et al. | |
| 2008/0294624 A1 * | 11/2008 | Kanigsberg | G06Q 30/0625 |
| 2009/0055249 A1 | 2/2009 | Lieberman | |
| 2009/0164929 A1 | 6/2009 | Chen et al. | |
| 2009/0222329 A1 | 9/2009 | Ramer et al. | |
| 2009/0222358 A1 | 9/2009 | Bednarek | |
| 2009/0254346 A1 | 10/2009 | Moore et al. | |
| 2009/0254348 A1 | 10/2009 | Moore et al. | |
| 2009/0285190 A1 * | 11/2009 | Baron | H04L 12/2867 370/338 |
| 2010/0169067 A1 * | 7/2010 | Basel | G06Q 30/02 703/21 |
| 2010/0223133 A1 * | 9/2010 | Scott | G06Q 30/0256 705/14.54 |
| 2010/0281044 A1 | 11/2010 | Gupta et al. | |
| 2010/0312650 A1 * | 12/2010 | Pinckney | G06F 16/9535 705/14.66 |
| 2010/0312724 A1 * | 12/2010 | Pinckney | G06N 5/048 706/11 |
| 2011/0025842 A1 | 2/2011 | King et al. | |
| 2011/0191321 A1 | 8/2011 | Gade et al. | |
| 2011/0252021 A1 * | 10/2011 | Clark | G06F 16/9535 707/722 |
| 2011/0258049 A1 * | 10/2011 | Ramer | G06Q 30/0273 705/14.66 |
| 2011/0289076 A1 | 11/2011 | Boyle et al. | |
| 2011/0313861 A1 * | 12/2011 | Lawrence, III | H04L 67/20 705/14.66 |
| 2011/0320470 A1 | 12/2011 | Williams et al. | |
| 2012/0054040 A1 * | 3/2012 | Bagherjeiran | G06Q 30/0255 705/14.66 |
| 2012/0066195 A1 | 3/2012 | Lee et al. | |
| 2012/0078953 A1 | 3/2012 | Araya | |
| 2012/0131032 A1 | 5/2012 | Rakshit | |
| 2012/0290446 A1 * | 11/2012 | England | G06Q 50/01 705/27.1 |
| 2013/0173604 A1 | 7/2013 | Li et al. | |
| 2014/0100952 A1 * | 4/2014 | Bart | G06Q 30/0264 705/14.53 |
| 2014/0164305 A1 | 6/2014 | Lynch et al. | |
| 2014/0164317 A1 | 6/2014 | Lynch et al. | |
| 2014/0164509 A1 | 6/2014 | Lynch et al. | |
| 2014/0180664 A1 | 6/2014 | Kochunni et al. | |
| 2014/0188552 A1 * | 7/2014 | Chan | G06Q 30/0269 705/7.29 |
| 2014/0274203 A1 | 9/2014 | Ganong et al. | |
| 2014/0280214 A1 | 9/2014 | Han et al. | |
| 2014/0316768 A1 | 10/2014 | Khandekar | |
| 2014/0343950 A1 | 11/2014 | Simpson et al. | |
| 2015/0039292 A1 | 2/2015 | Suleman et al. | |
| 2015/0095159 A1 | 4/2015 | Kennewick et al. | |
| 2015/0121216 A1 | 4/2015 | Brown et al. | |
| 2015/0142704 A1 | 5/2015 | London | |
| 2015/0169336 A1 | 6/2015 | Harper et al. | |
| 2015/0186156 A1 | 7/2015 | Brown et al. | |
| 2015/0193540 A1 | 7/2015 | Wexler | |
| 2016/0042069 A1 * | 2/2016 | Lee-Goldman | G06F 40/295 707/706 |
| 2016/0063560 A1 * | 3/2016 | Hameed | G06Q 30/0264 705/14.61 |
| 2016/0071517 A1 | 3/2016 | Beaver et al. | |
| 2016/0350659 A1 * | 12/2016 | Tsao | G06N 3/08 |
| 2017/0148433 A1 * | 5/2017 | Catanzaro | G06N 3/044 |
| 2017/0192956 A1 * | 7/2017 | Kaiser | G06F 40/211 |
| 2018/0336200 A1 * | 11/2018 | Lim | G06F 16/9535 |

OTHER PUBLICATIONS

B Liu and I Lane. Attention-Based Recurrent Neural Network Models for Joint Intent Detection and Slot Filling. arXiv. Sep. 6, 2016. <URL: https://arxiv.org/pdf/1609.01454> (Year: 2016).*

Gulla et al., "Implicit User Profiling in News Recommender Systems", WEBIST 1, 2014, 8 pages.

* cited by examiner

ADVANCED TECHNIQUES TO IMPROVE CONTENT PRESENTATION EXPERIENCES FOR BUSINESSES AND USERS

This application claims the benefit of the provisional patent document U.S. 62/543,400 filed on Aug. 10, 2016 with title Techniques to improve content presentation experiences for businesses, U.S. patent application 61/400,663 filed on Aug. 2, 2010, U.S. patent application Ser. No. 13/089,772 with title System and method for presenting targeted content, U.S. patent application Ser. No. 15/245,208 with title System and method for presenting targeted content, U.S. patent application Ser. No. 13/208,338 with title Method and system for resolving search queries that are inclined towards social activities, U.S. patent application Ser. No. 15/391,837, filed Dec. 27, 2016, which claims priority under 35 U.S.C. § 120 as a continuation-in-part of currently pending U.S. patent application Ser. No. 15/356,512, filed Nov. 18, 2016, which is a non-provisional application claiming the benefit under 35 U.S.C. § 119(e) of Provisional Patent Application Ser. Nos. 62/257,722, 62/275,043 and 62/318,762, filed Nov. 20, 2015, Jan. 5, 2016 and Apr. 5, 2016, respectively. The entire disclosures of all said prior applications are hereby incorporated by reference.

BACKGROUND

Field of Invention

The subject matter in general relates to the field of generating recommendations for a user in an online environment. More particularly, but not exclusively, the subject matter relates to generating search tokens for a user based on a user behavior profile.

Discussion of Related Art

Deep learning techniques and reinforcement learning are increasingly delivering successful results in solving tough problems involving automatic speech recognition and translation, driverless cars, natural-language processing, image recognition and virtual assistants, among other applications. These techniques greatly aid in improving business and customer interactions.

The above-mentioned techniques can also be used to improve content, advertisement and merchandising recommendation algorithms that are used by e-commerce websites such as TopGifter, eBay, Flipkart and Amazon, among others. Additionally, content and advertisement targeting algorithms on social networks such as Facebook, WeChat, LinkedIn, Twitter, Instagram and other publisher sites can be significantly improved by borrowing techniques from Deep Learning and Reinforcement learning and building a rich user profile.

Deep Learning techniques can also be used to improve actionable advertisements that a user can pursue if they are interested in the product offered in the advertisement. To elaborate, merchants and businesses today are spending a considerable amount of advertisement money on video and display advertising, hoping that the advertisements will bring in customers and increase their customer base. Such merchants can make better use of their marketing budget with actionable ads (ads which require immediate action from the user) and by targeting users who will have an anticipated need in the near future.

Extending further on the above ideas, users spend most of their time on social websites and surfing news on the internet. If they need information about a topic, the user goes to a search engine and enters the query to get the search results. A significant percentage of search queries on popular search engines are motivated by the behavior of the users on different websites and on social networks. The user now has to stop his internet activity, open a different browser session, enter the Uniform Resource Locator (URL) for the search engine and type the search query to get information. It would be helpful and efficient to predict search queries based on the user's behavior across the internet and subsequently present results wherever the user is.

In view of the foregoing discussion, there is a need to overcome the above problems and improve user experience.

SUMMARY

Accordingly, improved techniques to overcome the above problems are needed. To fulfill this need, a method for generating search tokens for a user is provided. The method comprises a server, wherein the server comprises one or more processors. The server is configured to receive and store one or more user information in a user database. Further, the server identifies one or more of profiles or accounts of the user on one or more digital platforms. The server then collects, and stores one or more information related to one or more activities of the user on the digital platforms and in external systems, in the user database. The server then builds a user profile vector to characterize the user's behavior. Further, the server processes the user profile vector with the help of a learning module in order to derive one or more search tokens. Subsequently, the server may rank the search tokens to identify one or more content that is of interest to the user.

In an embodiment, the method further includes displaying the content to the user through one or more of the digital platforms used by the user, based on the search tokens.

In an embodiment, the content includes one or more of an advertisement, a notice, a suggestion or an actionable recommendation that capture the interest of the user, derived from the search tokens.

In an embodiment, the digital platforms include one or more of social networks, search engines, chat history, applications or websites.

In an embodiment, the user profile vector is built by processing one or more word tokens derived from one or more of a social network, previous search engine queries, offline location data, meeting information, user demographic information, vectors for the images that the user sees, or the time associated with each event.

In an embodiment, the aggregated user profile vector is used in one or more collaborative filtering modules as an additional variable to generate one or more of similar item recommendations and user recommendations.

In an embodiment, the aggregated user profile vector is used to augment Deep Reinforcement Learning algorithms by re-using observations from other similar users.

In an embodiment, a method for generating hyper personalized actionable ads for businesses is provided. The method uses Artificial Intelligence to predict when, what item and which customer should the marketing message be sent to based on the aggregated user profile of the user.

In an embodiment, a method for generating a hyper-personalized marketing message for a user is provided. The method comprises a server that is configured to collect and feed one or more inputs related to the user into a learning module. Further, the server determines, using the learning module, an item, optimum discount for the item and an optimum time to recommend the item to the user. Subsequently, the server recommends the item to the user at the optimum time and determines whether the user is interested in the recommended item. Further, the server communicates with one or more external systems to place an order comprising the item for the user.

In an embodiment, a method for generating personalized advertisement for a user, the method comprises a server configured for collecting one or more training data related to a user. The server feeds the training data into one or more neural network learning systems to identify one or more search tokens wherein the one or more search tokens comprise topics that are of interest to the user. Further, the server builds an aggregated user profile using one or more data based on one or more other users who are similar to the user. Subsequently, the sever uses the aggregated user profile to augment one or more deep reinforcement learning algorithms. The server then uses one or more outputs of the one or more deep reinforcement learning algorithms to determine one or more items that may be of interest to the user and recommends one or more items to the user in a hyper-personalized marketing message.

In an embodiment, a system for allowing advertisers to bid ads to show with content based on search tokens that are predicted using behavior.

Other objects, features, and advantages of the present invention will become apparent from the following detailed description. It should be however understood that the detailed description and specific examples, while indicating preferred embodiments of the present invention, are given by way of illustration only and various modifications may naturally be performed without deviating from the present invention.

BRIEF DESCRIPTION OF DIAGRAMS

This disclosure is illustrated by way of example and not limitation in the accompanying figures. Elements illustrated in the figures are not necessarily drawn to scale, in which like references indicate similar elements and in which.

DETAILED DESCRIPTION OF THE INVENTION

The following detailed description includes references to the accompanying drawings, which form part of the detailed description. The drawings show illustrations in accordance with example embodiments. These example embodiments are described in enough details to enable those skilled in the art to practice the present subject matter. However, it will be apparent to one of ordinary skill in the art that the present invention may be practiced without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken as a limiting sense.

In this document, the terms 'a' or 'an' are used, as is common in patent documents, to include one or more than one. In this document, the term 'or' is used to refer to a non-exclusive 'or' such that "A or B" includes "A but not B", "B but not A", and "A and B", unless otherwise indicated.

It should be understood that the capabilities of the invention described in the present disclosure and elements shown in the figures may be implemented in various forms of hardware, firmware, software, non-transitory computer readable medium or combinations thereof.

Overview

The embodiments disclose techniques for generating search tokens for a user. Often, a user who wants to search for a particular topic on a search engine gets distracted and forgets to search for it. Other times, the user may not have sufficient time or patience to manually search for a topic of interest. This causes loss of potential revenue for merchants and loss of business for other websites. Hence, merchants and websites can use the disclosed system to process user data to generate search tokens that may be of interest to the user. These search tokens may be used for creating customized digital content such as targeted and actionable advertisements and merchandise recommendations, which are widely used in various types of commercial websites. Further, these can be improved by using the disclosed system for generating search tokens for a user as provided below.

A rich user behavior profile can be constructed by aggregating information from multiple websites and offline actions of the user. The websites include social networks, search engines and other websites. A user's activities can be collected from multiple websites using one-way hashes to protect the privacy of the user. The user profile vector can be built to characterize the user behavior. This can be done by summing up word vectors for tokens aggregated from social feeds, search queries, chat history and information about friends.

In an embodiment, the user profile vector can then be used in collaborative filtering algorithms as an additional variable to generate one or more user recommendations on the websites. In case there isn't enough data to compute the expected value for showing a recommendation, data derived from interactions between similar users and generated recommendations can also be used. The aggregated behavior can then be converted into a vector which will be used to generate search tokens for the user. Using these search tokens, advertisements and recommendations can be shortlisted and communicated with the user in the form of an actionable advertising message on communication platforms such as websites visited by the user, FACEBOOK MESSENGER or SMS, among others. When the user accepts the recommendation, the system may place an order on behalf of the user, which can then be inserted into the point of sale system using an API call or through an email which can be sent to the merchant.

The aggregated User Profile Vector can also be used to generate content and advertisement recommendations using Deep Reinforcement Learning. In an embodiment, this can be implemented by a three-stage algorithm. In the first stage, all the eligible content articles for the user are gathered. In the second stage, the eligible content can then be ranked using an inexpensive ranking function in the second step. In the final stage, a more expensive ranking can be used to rank the content articles. In an embodiment, expected value of the results is used to rank the results. The expected value of showing content to the user can be computed using Deep Reinforcement Learning and/or Regression methods.

Instead of spending a marketing budget on media advertising, it is profitable to target users who may have an anticipated need soon. The system determines the needs of the user and targets the user with one or more hyper-personalized actionable ads (advertisements which require immediate action from the user). In this regard, the aggregated profile vector, previous purchase data and one or more item vectors can be fed into a Deep Reinforcement Learning algorithm to determine one or more items that may be of interest to the user. These items may be recommended to the user in a hyper personalized marketing message. The optimum discount rate as well as optimum time to recommend the items can also be calculated and used while recommending the items.

System and Method for Generating Search Tokens for a User

Figure 1:
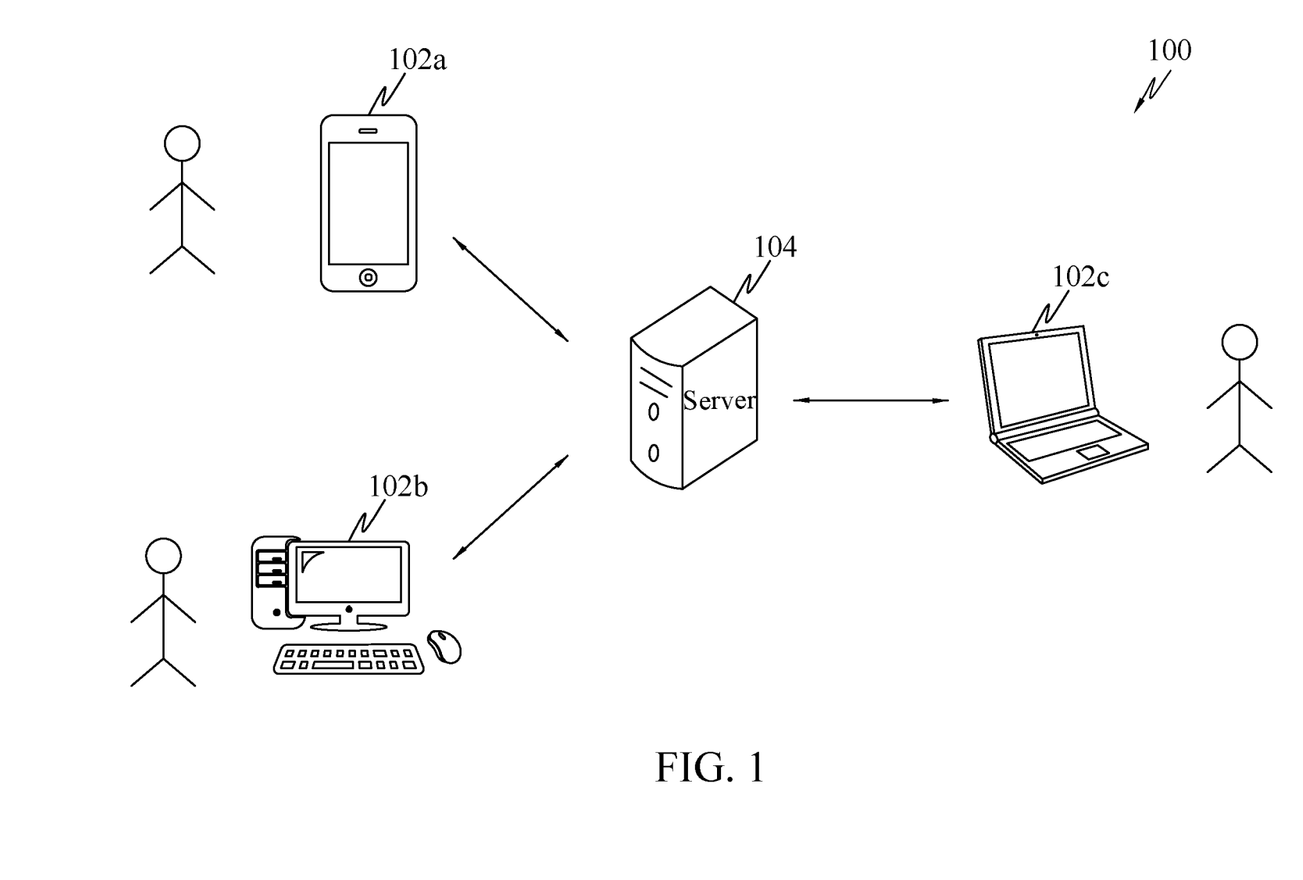
FIG. 1 illustrates an exemplary architecture of a system 100 for generating search tokens for a user, in accordance with an embodiment.

FIG. 1 illustrates an exemplary architecture of a system 100 for generating search tokens for a user, in accordance with an embodiment. The system 100 includes a server 104 that communicates with one or more users using their data processing devices 102a-c. User A may operate their device 102a, namely, their mobile phone; user B may operate their device 102b which is a desktop computer and user C may operate their device 102c which is a laptop.

The device 102 (also referred to as a device of the user) may include mobile phones, palmtops, PDAs, tablet PCs, notebook PCs, laptops and computers, among other computing devices. In an embodiment, the device 102 may include any electronic device equipped with a browser to communicate with the server 104. The device 102 may be used by the user to communicate with other users. The device 102 may also include one or more input and output components such as a microphone, keypad, speaker and display, among others.

The server 104 may be implemented in the form of one or more processors with a memory coupled to the one or more processors. The server 104 may be implemented as appropriate in hardware, computer-executable instructions, firmware, or combinations thereof. Computer-executable instructions or firmware implementations of the server 104 may include computer-executable or machine-executable instructions written in any suitable programming language to perform the various functions described. Further, the server 104 may communicate with one or more external sources and one or more user's devices 102 through the communication module 202.

Figure 2:
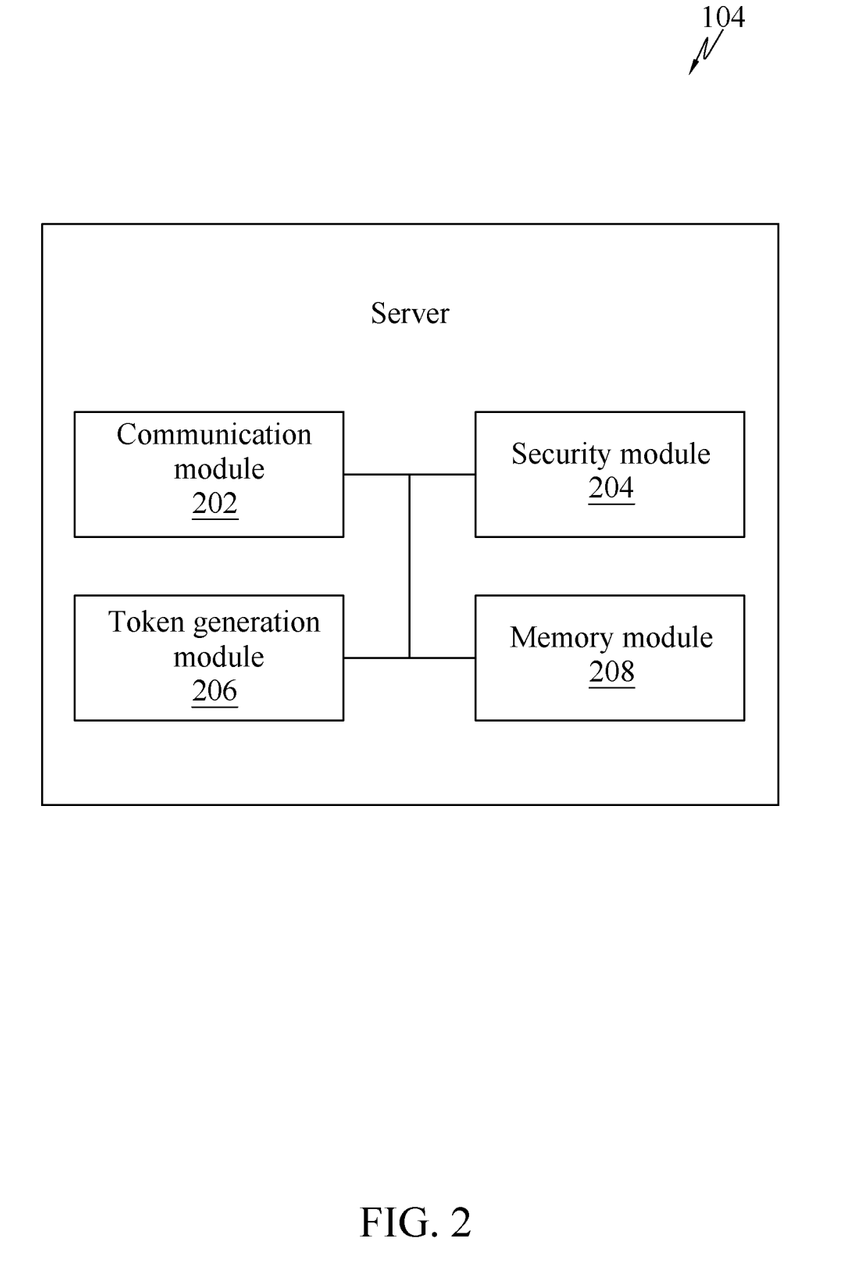
FIG. 2 illustrates an exemplary block diagram 200 of a server 104, in accordance with an embodiment.

FIG. 2 illustrates an exemplary block diagram 200 of a server 104, in accordance with an embodiment.

In an embodiment, the server 104 comprises a communication module 202, a security module 204, a token generation module 206 and a memory module 208.

In an embodiment, the communication module 202 may provide an interface between the server 104 and one or more users' devices 102a-c. The communication module 202 may support both wired and wireless protocols. Data in the form of electronic, electromagnetic, optical signals and other signals may be transferred via the communication module 202. Further, the communication module 202 may be present for different technologies including WLAN, LTE and GPS, among others.

In an embodiment, the security module 204 may be configured to implement one or more security protocols and/or applications in order to protect one or more data stored or transmitted by the system 100.

In an embodiment, the token generation module 206 may be configured to include one or more modules that may be responsible for generating one or more search tokens related to the user.

In an embodiment, the memory module 208 may be implemented in the form of a primary and a secondary memory. The memory module 208 may store additional data and program instructions that are loadable and executable on the server 104, as well as data generated during the execution of these programs. Further, the memory module 208 may be volatile memory, such as random-access memory and/or a disk drive, or non-volatile memory. The memory module 204 may further include one or more removable memory such as a Compact Flash card, Memory Stick, Smart Media, Multimedia Card, Secure Digital memory, databases or any other memory storage that exists currently or may exist in the future.

Figure 3:
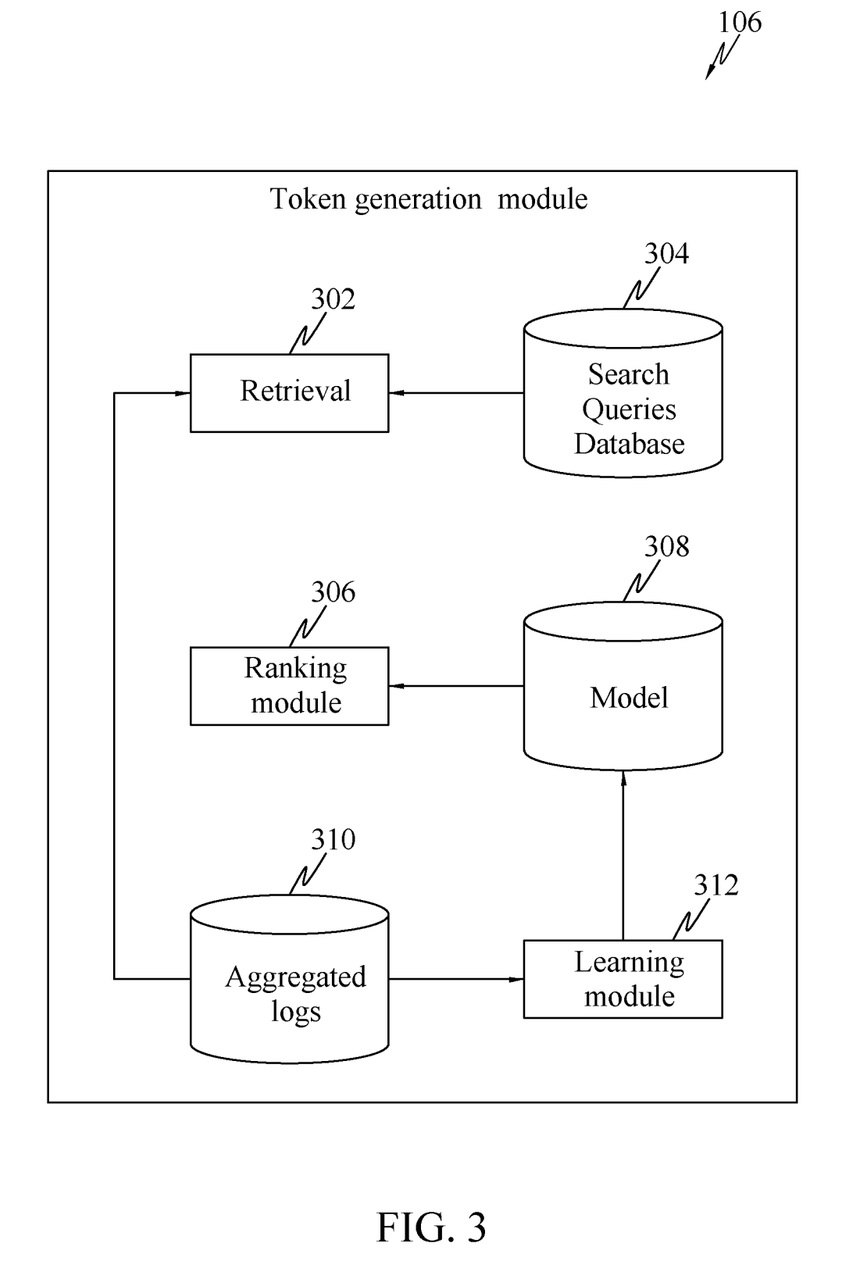
FIG. 3 illustrates an exemplary block diagram 300 of a token generation module 206 for the system 100, in accordance with an embodiment.

FIG. 3 illustrates an exemplary block diagram 300 of a token generation module 206 for the system 100, in accordance with an embodiment. The token generation module 206 includes a retrieval module 302, a search queries database 304, a ranking module 306, a model database 308, aggregated logs 310 and a learning module 312.

In an embodiment, the retrieval module 302 may be configured to implement one or more machine-learning models and/or human-defined rules. The retrieval module 302 may determine a list of search queries after processing one or more inputs including data related to the user and user behavior profile. The retrieval module 302 may communicate the retrieved search queries to one or more modules present in the system 100.

In an embodiment, the search queries database 304 may comprise one or more search queries related to one or more topics that the user may be interested in. The retrieval module 302 may communicate one or more search queries related to one or more topics to the ranking module 306.

In an embodiment, the ranking module 306 may be a module comprising a deep feed forward neural network, used to rank one or more search queries according to the probability of being used/popular with the user. The deep feed forward neural network may compute a "tan[h]" score on one or more input features in order to rank the items.

In an embodiment, one or more input features for the ranking module 306 may comprise one or more of word embeddings of search tokens, aggregated behavior, location of the user or demographic information of the user.

In an embodiment, when a user conducts online activity, one or more search queries in the form of one or more search tokens may be generated. The user's actions, queries and impressions may be recorded into the aggregated logs 310 as training data for the learning module 312.

In an embodiment, the learning module 312 may comprise one or more machine learning and/or artificial intelligence methods that may be trained with one or more input data to achieve a certain task. The input data may include one or more of user actions, search queries or user impressions, which may be communicated as training data to the learning module 312.

Figure 4:
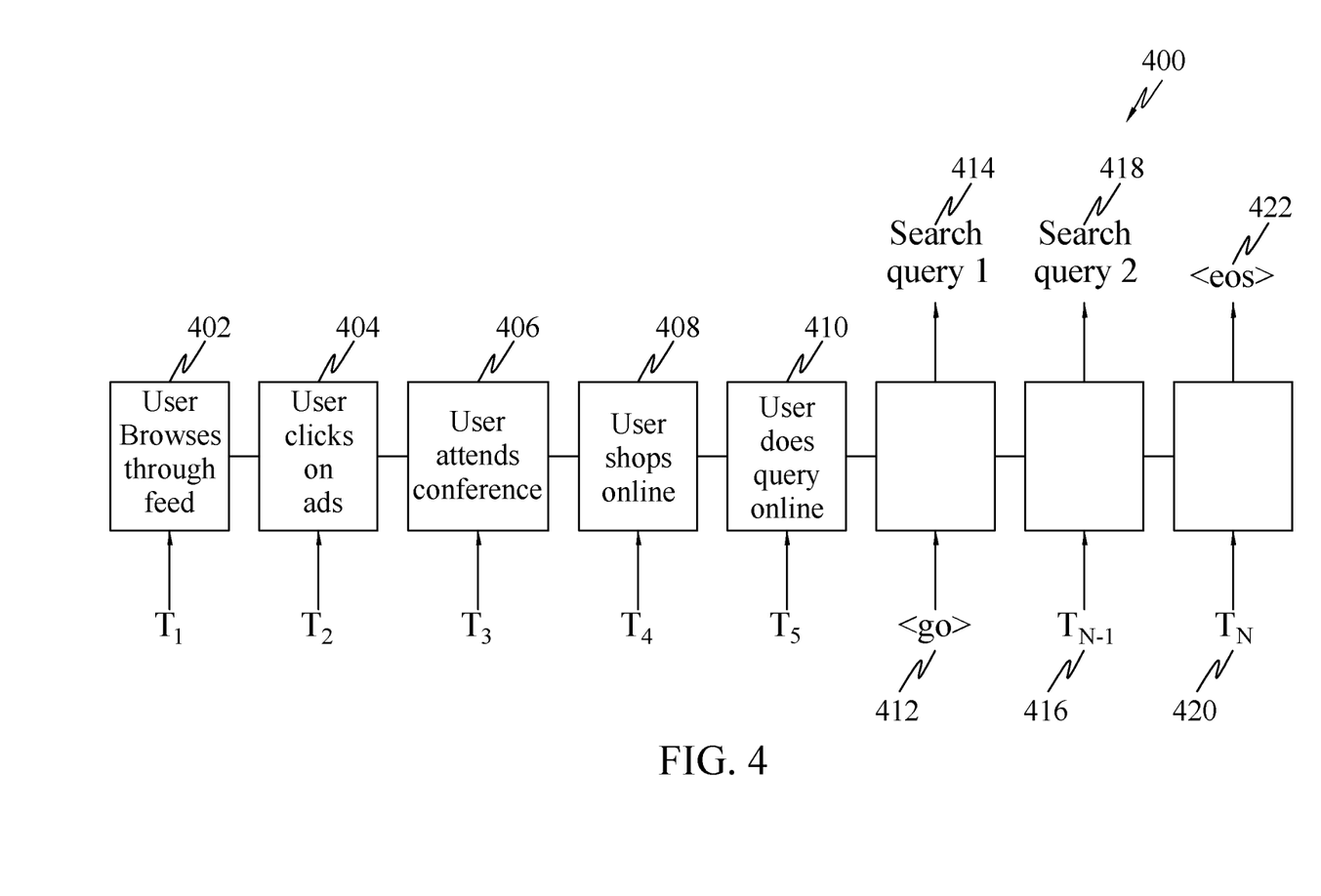
FIG. 4 illustrates an exemplary block diagram 400 for a behavior-to-search model for the system 100, in accordance with an embodiment.

FIG. 4 illustrates an exemplary block diagram 400 for a behavior-to-search model for the system 100, in accordance with an embodiment. This figure depicts the inputs and outputs of the various stages in the generation of search tokens for a user.

In an embodiment, the behavior-to-search algorithm depicted in FIG. 4 may comprise two Recurrent Neural Networks (RNN). The first RNN may comprise an encoder that may process the input data. The second RNN may comprise a decoder that may generate the output search tokens. The behavior-to-search model may predict one or more follow up queries that the users may type onto a search engine after experiencing one or more events.

In an embodiment, the behavior-to-search algorithm may receive training data for the aggregated user behavior and search query from multiple applications as follows. The input may include one or more data from a digital social platform viewed by the user, as depicted in step 402. The input may include an advertisement feed that was viewed by the user as depicted in step 404. The input may include meeting information and geographical information related to one or more offline events attended by the user, as depicted in step 406. Another input may include one or more websites, items, services and brands that the user viewed while shopping online, as depicted at step 408. Another input may include one or more online queries entered by the user into a search engine, and the subsequent websites, articles and information viewed by the user, as depicted at step 410. Further, a 'go' signal may be entered as an input in order to initiate the generation of the search tokens, as depicted at step 412. Thus, the RNN may generate the first search token, 'search query 1', as depicted at step 414 and a second search token 'search query 2', as shown in step 418. It is to be noted that the behavior-to-search model may generate more than two search tokens, according to the inputs and computation of the model. The time series $T_{N-1}$ may be entered as shown at step 416 and $T_N$ may be entered as shown at step 420. The signal 'EOS' may depict the end of the output computation, as shown at step 422.

Figure 5:
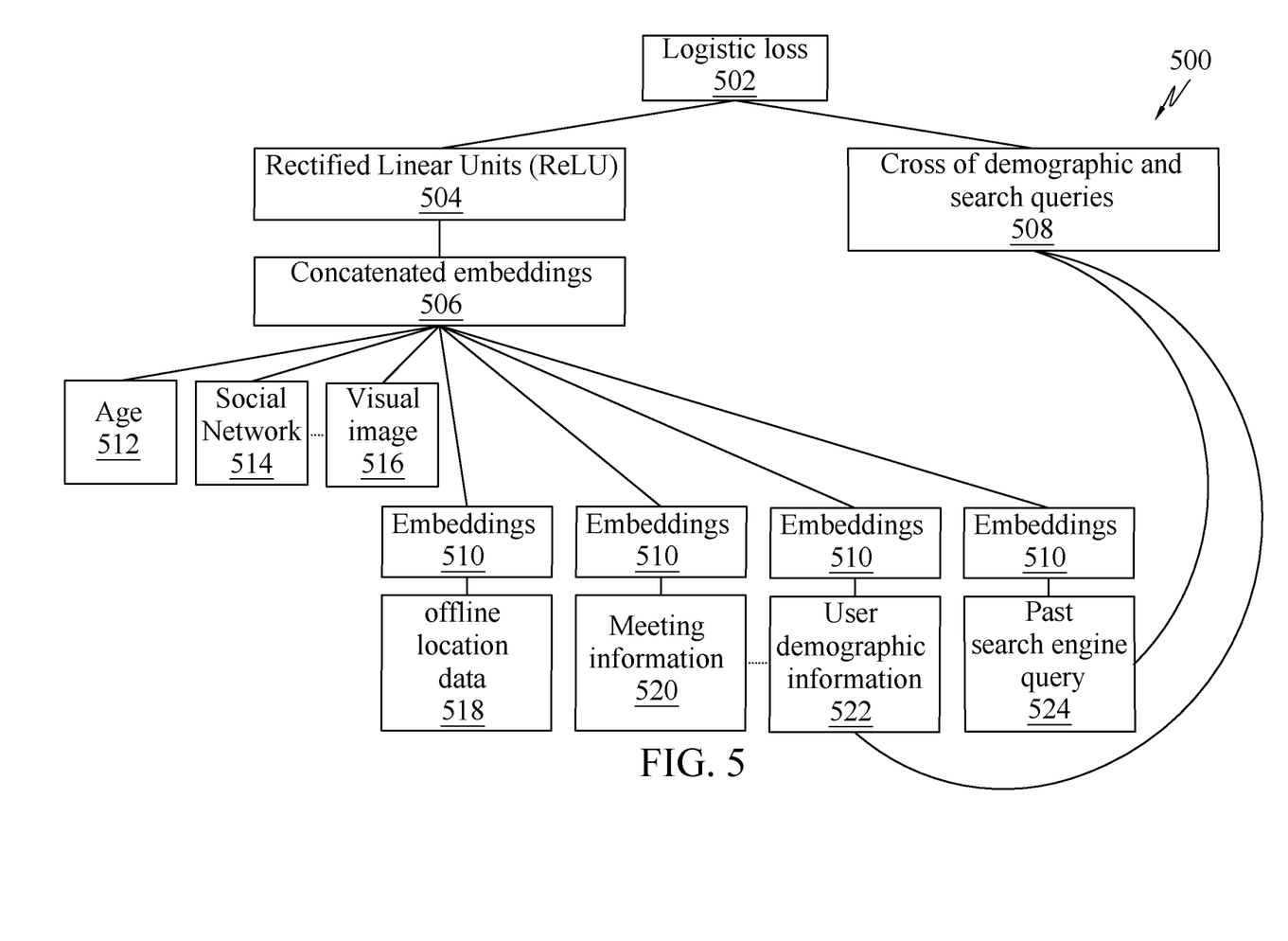
FIG. 5 illustrates an exemplary block diagram 500 for a wide and deep neural network for the system 100, in accordance with an embodiment.

FIG. 5 illustrates an exemplary block diagram 500 for a wide and deep neural network for the system 100, in accordance with an embodiment. One or more training data may be entered as an input into one or more wide and deep neural networks to gather and rank web search queries. The wide and deep neural network may be used to focus on one or more different information elements to generate the search tokens. Further, the wide and deep neural network may be used for the accumulation and ranking of one or more search queries determined by the behavior-to-search neural network model.

In an embodiment, the input data for FIG. 5 may comprise one or more data related to the user including one or more of age 512, social network 514 used by the user, visual images 516 viewed by the user, offline location data 518 of the user, meeting information 520 of the user, user demographic information 522, or past search engine query 524. The embeddings 510 vector of one or more of these input data may be determined and subsequently concatenated with one or more of the other features available to the system 100, to create concatenated embeddings 506. The embeddings may then be communicated to one or more Rectified linear units (ReLU) 504 layers, which is similar to a ramp function. The output of the Rectified linear units (ReLU) 504 may be trained to optimize the logistic loss on predicting embeddings for one or more search tokens.

Figure 7:
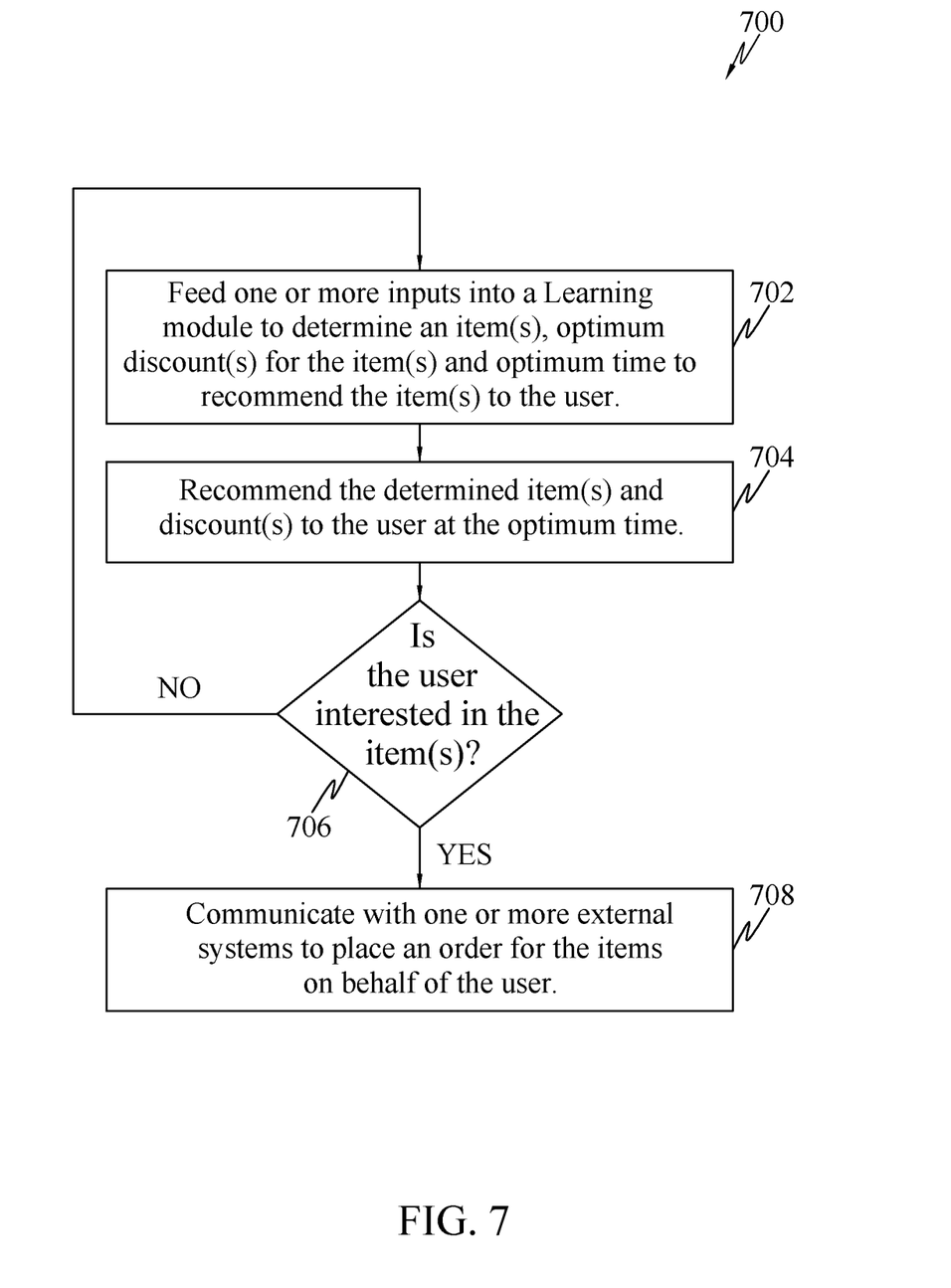
FIG. 7 illustrates an exemplary flow diagram 700 depicting a method for generating a hyper-personalized marketing message for the system 100, in accordance with an embodiment.

FIG. 7 illustrates an exemplary flow diagram 700 depicting a method for generating a hyper-personalized marketing message for the system 100, in accordance with an embodiment.

In an embodiment, according to step 702, the system 100 may feed one or more inputs into a learning module to determine one or more item(s), optimum discount(s) for the item(s) and optimum time to recommend the item(s) to the user. Further, the system 100 may recommend the determined items and discounts to the user at the optimum time, as shown at step 704. The system 100 may then determine whether the user is interested in the items, as shown at step 706. In case the user is not interested in the recommended items, the system 100 may proceed to step 702 to determine one or more other items that the user may be interested in. Further, in case the user was interested in the item, the system 100 may communicate with one or more external systems to place an order for the items on behalf of the user, as shown at step 708.

In an embodiment, the system 100 may collect one or more user data to build a user profile vector using which, customized search tokens can be generated for a particular user. The search tokens may comprise items or topics of interest to the user. Thus, the search tokens may be used for a number of applications such as a) generating content articles for a user; and b) advertisement monetization.

Data Enrichment for Deep Learning Algorithms

Figure 6:
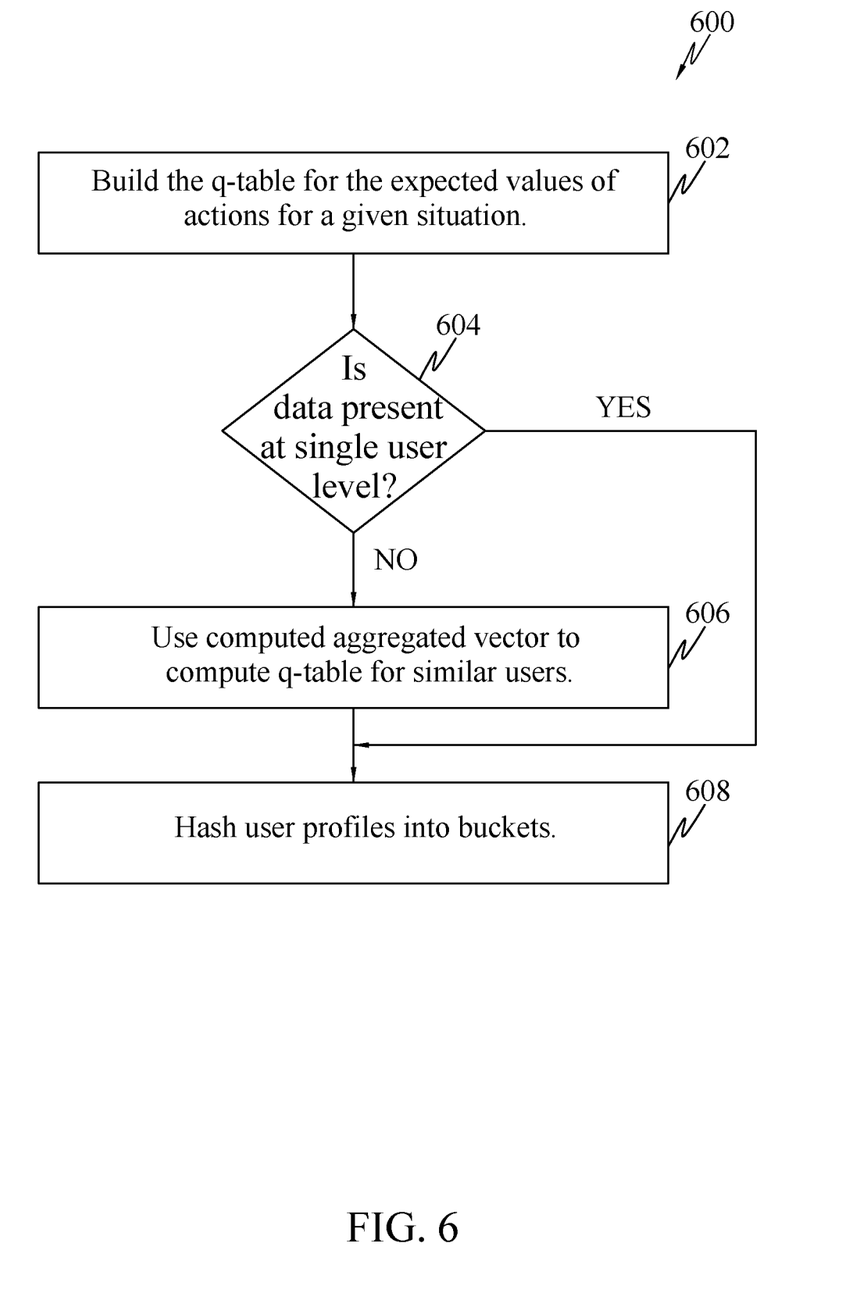
FIG. 6 illustrates an exemplary flow diagram 600 depicting a method for using aggregated user behavior using the system 100, to enrich Deep Reinforcement Learning algorithms for the system 100, in accordance with an embodiment.

FIG. 6 illustrates an exemplary flow diagram 600 depicting a method for generating aggregated user behavior using the system 100, in accordance with an embodiment.

In an embodiment, a q-table may be built for the expected values of one or more actions for a given situation, as shown at step 602. Further, the system 100 may receive one or more inputs from the user vector and centroid vector of the user cluster using one or more aggregated profiles, as shown in step 604. The system 100 may then use the computed aggregated vectors to compute similar users, and use actions from one or more similar users to build the values of the q-table for the user, as shown at step 606. Subsequently, the system 100 may hash one or more use profiles into one or more buckets, as shown at step 608.

In an embodiment, for some users, there may be a lack of historic data at a user level which is required to determine the expected value of an advertisement/content article to the user. In this case, data derived from interactions between similar users and generated ads may be used for generating search tokens for the user. Thus, the system 100 may determine an aggregated user profile from multiple online and offline sources and further use the aggregated user profile to generate search tokens for a similar user.

In an embodiment, one or more of an aggregated profile vector, previous purchase data or one or more item vectors may be fed into a Deep Reinforcement Learning algorithm to determine one or more items that may be of interest to the user. These items may be recommended to the user in a hyper personalized marketing message.

In an embodiment, an end-to-end training algorithm such as Deep Reinforcement Learning/Deep Neural Net Supervised algorithm may be used to predict one or more features including timing of the advertisement, recommended item or user segment for the actionable marketing message described above.

In an embodiment, one or more recommendation algorithms including Collaborative Filtering algorithm leveraging one or more of previous clicks, order transactions or aggregated user behavior profiles may be used to determine similar item recommendations for the user.

In an embodiment, the Deep Reinforcement algorithm may build a value table or a q-table for the expected values of actions at a given state and previous actions/interactions between the user and the content articles. To build the value table or the q-table, data may not be available for each user. In this case, the aggregated vector may be to be computed for one or more similar users. Subsequently, one or more actions from similar users crossing a certain similarity threshold may be used to build the values of the q-table for the user.

In an embodiment, the aggregated user profile vector may be used in one or more collaborative filtering algorithms as an additional variable to generate one or more recommendations and content articles for the user.

In an embodiment, the recommendations may include one or more of similar items or other recommendations on the websites seen by the user.

DETAILED DESCRIPTION

Generating Search Tokens

In an embodiment, as an example, user A may use their mobile phone 102a, user B may use their desktop computer 102b and user C may use their laptop 102c as depicted in FIG. 1. The server 104 may comprise one or more processors operable to receive and store one or more user information related to one or more users in a user database. One or more external data may be received from one or more external sources such as e-commerce websites, social media networks or databases, among others. Further, the server 104 may identify one or more profiles and/or accounts of the user on one or more digital platforms. The server 104 may then collect and store one or more information related to one or more activities of the user on the digital platforms and in external systems, in the user database. Subsequently, the server 104 may build a user profile vector to characterize the user's behavior. Further, the server 104 may process the user profile vector with the help of a learning module 312 in order to derive one or more search tokens and rank the search tokens to identify one or more content that is of interest to the user.

As an example, the user may have looked at one or more pictures of chocolate cakes on a digital social platform. The server 104 may identify and/or verify the user's profile and/or virtual account(s) using one or more stored or external data to confirm the identity of the user. Further, the server 104 may collect and store information related to the images viewed by the user on the digital social platform. The server 104 may then use the learning module 312 to build a user profile vector to derive one or more search tokens. Further, the server 104 may rank the search tokens to identify one or more content that is of interest to the user. The topmost results in the search tokens may include content related to chocolate cake such as "Best chocolate cake", "Buy chocolate cakes online now" and "Get chocolate cake delivered to your doorstep", among others. The server 104 may contact one or more external systems that are related to the content. Thereafter, the server 104 may suggest or recommend chocolate cakes to the user by displaying one or more images or videos of a chocolate cake from a particular chocolate cake company called "Cake Zone" to the user. Further, the server 104 may communicate one or more of advertisement, notice, a suggestion or an actionable recommendation to the user. Thus, the user may follow up on the content of the search tokens generated by the learning module 312 of the server 104.

In an embodiment, the system 100, in particular, the server 104 may build the user's user profile vector by processing word tokens derived from one or more of a social network, previous search engine queries, offline location data, meeting information, user demographic information, vectors for the images that the user sees, or the time associated with each event, among others. The word tokens may comprise words or phrases related to the content viewed by the user.

In an embodiment, the user profile vector may be used to train one or more learning modules to generate one or more search tokens. The search tokens may comprise words/phrases that are predicted to be of interest to the user.

In an embodiment, the server 104 may generate the search tokens using Machine Learning (ML) algorithms and rule-based algorithms. As an example, in an embodiment an inverted index may be built, comprising search queries annotated with broad level categories from one or more users. A Latent Dirichlet allocation (LDA) algorithm and/or manually annotated rules may be used to construct one or more broad level categories from the aggregated user behavior. These broad level categories may then be used to gather all the possible search queries, which may be communicated to other modules as search tokens.

In an embodiment, the retrieval module 302 may communicate the retrieved search queries to the ranking module 306, which may use one or more ranking methods to rank the search queries. Further, the ranking module 306 may rank the search queries according to their scores.

The recommendation algorithm may comprise a two-step process. In the first step, possible search tokens may be generated. In the second step, the search tokens may be ranked and the top 'n' selected search tokens may be recommended to the user. The search queries relate to possible queries that the user may browse online.

In an embodiment, the generation of search tokens may be implemented in three stages. In the first stage, one or more input data related to the user may be gathered. Further, in the second step, the ranking module 306 may use one or more generic or inexpensive ranking functions to rank the results. Optionally, in the third step, the ranking module 306 may use a more specific or expensive ranking system for the same.

In an embodiment, the server 104 may process the search token(s) using one or more ranking modules 306 and rank them according to their effectiveness on the user.

In an embodiment, the search tokens may be derived using a behavior-to-search algorithm including one or more of attention mechanism or external memory.

In an embodiment, the attention mechanism may be used to focus on salient data parts, such as focusing on a single part of the provided data subset at a time. It may also be used as an approach for memory addressing. A conventional sequence-to-sequence model may reduce its input into a single vector and then expand it to generate the output. However, the system 100 may enhance this method by using the attention mechanism. The attention mechanism may allow the input-processing encoder module to pass along information regarding each data it may process. Further, the attention mechanism may allow the output-generating decoder module to focus on any relevant data.

In an embodiment, using memory mechanism may provide data storage over a period of time.

In an embodiment, each box in FIG. 4 may represent an RNN cell with an attention mechanism capable of retaining memory, such as, for example, a gated recurrent unit (GRU) or a long short-term memory (LSTM) cell. The encoder and the decoder may share weights or use different sets of parameters. Every input transmitted into the RNN cells may be encoded into a fixed-size state vector which may be passed on to the decoder.

In an embodiment, the LSTM cell may include one or more cells that each include an input gate, a forget gate, and an output gate that may allow the cell to store previous states for the cell. This LSTM cell may be used in generating a current output or it may be provided to other components of the LSTM neural network.

In an embodiment, as an example, the encoder cells may use the user behavior profile as an input sequence. Further, the encoder cells may process and output one or more titles of newly crawled data as a concatenation of word vectors (through an average of word vectors) to predict one or more information search queries. The decoder cell may produce one or more search tokens as long as the <EOS> (end of signal) token is not created. Once the <EOS> signal is created, the system may stop the generation of search queries.

In an embodiment, the encoder and decoder LSTM cells may use Gradient Descent Backpropagation to optimize the cross-entropy loss while determining the probability to predict the next token in the sequence. Further, one or more training data comprising aggregated user behavior data may be presented in a time series sequence and Information Search queries, which may be fed to the encoder and decoder LSTM cells.

In an embodiment, as an example, one or more training data comprising of aggregated user behavior data and Navigation Search queries may be fed to the encoder LSTM cell(s). The encoder LSTM cell(s) may use the attention mechanism on the encoded vector of the input sequence comprising behavior data and newly crawled popular data to predict one or more queries such as stock price of PCLN. The attention vector and weights for the LSTM cell(s) may be trained using Gradient Descent Backpropagation to minimize the cross entropy and predict search tokens.

In an embodiment, as an example, one or more input features may be entered into the LSTM cell(s). The input features may comprise one or more of word embeddings of search tokens, aggregated user behavior, user features such as location of the user or one or more demographic information of the user to rank the results. The output of the RNNs may be given as an input to the ranking module 306.

In an embodiment, the behavior-to-search model of FIG. 4 may receive inputs using a time series data. Further, the inputs may include one or more word-tokens of the user's aggregated user behavior. These word tokens may be derived from one or more sources such as digital social platforms, previous search engine queries, offline location data, meeting information, user demographic information and vectors for the images seen by the user. Furthermore, the time associated with each of the events may be the time-series input source for the behavior-to-search model.

In an embodiment, consider the following example inputs for the behavior-to-search model.

Behavior Input in the last 5 hours:
a) Social Feed—user saw a notification of Sam's upcoming 30th birthday, user liked Nicki's video on New Zealand, user commented on pictures of Jane's Lake Tahoe vacation pictures, among others.
b) Advertisement feed—user read reviews in the advertisement of a book 'Mathematics of Stock Market' and user has clicked on an advertisement for 'Unique Birthday gifts'.
c) Offline Events—user went to an Artificial Intelligence meeting in San Francisco, user met his previous co-worker Christa at Starbucks in Palo Alto and user ate lunch at Olive Garden.
d) Online shopping—user shops online for 'home swing set', user browses different brands of cheese, user chooses a home service for picking up laundry on a website.
e) Online queries—user has used his VR gear to explore Grand Canyon and user searched for Bay Area home prices and PCLN stock <EOS>.

In an embodiment, the output may comprise the generated search tokens of the behavior-to-search model. As an example, the output may be: Actual Search queries in the next hour: AI Frontiers Conference, Birthday gifts for a 30-year-old, buy cheese online and vacations in New Zealand.

In an embodiment, in addition to the behavior vector, the titles/summary of newly crawled popular data from one or more search engines may be communicated as an input to the behavior-to-search model.

In an embodiment, the wide component of the figure comprises a linear model while the deep component may comprise a feed-forward neural network. The inputs may be in the form of strings, which are converted into a vector called embedding vector. One or more of these embeddings are initialized and trained to minimize a final loss function related to the training of the model. The deep component and the wide component may be combined using one or more weighted sums.

In an embodiment, one or more search queries may be entered as an input into a wide and deep neural network for the search queries trained to optimize logistic loss on predicting embeddings for search tokens. As an example, a network with memorization using Wide Neural Network may be used to predict one or more navigation search queries derived from cross training data. The training data may comprise one or more behavior patterns and search queries. The training data itself may be expressed as AND [pcln search query=1, pcln search query] based on one or more past interactions of aggregated user behavior and the search queries. The deep neural network may use the embedding of the same aggregated user behavior and rank the informational search queries.

In an embodiment, a method for generating search tokens for a user may be provided. The method may comprise receiving and storing one or more user information in a user database. Further, the method may comprise identifying one or more profiles and accounts of the user on one or more digital platforms. The method may then comprise collecting and storing one or more information related to one or more activities of the user on the digital platforms and in external systems, in the user database. Subsequently, the method may comprise building a user profile vector to characterize the user's behavior and processing the user profile vector with the help of a learning module in order to derive one or more search tokens. Thereafter, the method may comprise ranking the search tokens to identify one or more content that may be of interest to the user.

In an embodiment, in case the user data related to the user's online profile and/or accounts was insufficient or unavailable, the server 104 may build a user profile vector based on one or more other users who are similar to the user.

This user profile vector or user profile behavior may be called an aggregated user profile. The aggregated user profile may be constructed by aggregating information from one or more websites and offline store actions. The websites may include one or more of social networks, search engines or websites. The activities of a similar user profile may be collected from multiple websites using one-way hashes to protect the privacy of the user. We may build a user profile vector to characterize the user's behavior. In an embodiment, this may be accomplished by summing up word vectors for search tokens aggregated from social feeds, search queries, chat history or information about friends. In another embodiment, the word vectors of tokens of anonymized behavioral data may be concatenated.

In an embodiment, while evaluating similarity between two or more users, their similarity may be computed using cosine similarity between two user vectors along with other variables such as conditional probability distances between the users. This step may also be combined with one or more bucketing techniques to increase the efficiency of the comparison.

In an embodiment, the user profiles may be hashed into one or more buckets using mechanisms such as Locality Sensitive Hashing algorithms to make the computation faster and reduce the memory space required for computing user similarity.

In an embodiment, the server 104 may use one or more recommendation algorithms to predict search tokens and/or search queries based on aggregated user behavior.

In an embodiment, the server 104 may be further configured to display the content to the user on one or more of the digital platforms used by the user.

In an embodiment, the digital platforms may include one or more of social networks, search engines, chat window, applications or websites.

In an embodiment, the content may include one or more of an advertisement, a notice, a suggestion or an actionable recommendation that capture the interest of the user.

In an embodiment, the system 100 may determine when the merchant should send an actionable marketing message to the user. As an example, the system 100 may determine whether the marketing message must be communicated to the customer before lunchtime or dinner time; or after a single day or after seven days of their previous purchase, among others. The timing of the marketing message may have a significant impact on its conversion rate. This problem may be treated as a regression problem in Machine Learning. One or more features such as previous transactions, search history and social media posts may be used to determine the timing of the marketing message for the user. Further, data related to responses from similar users computed using methods described above may also be used.

In an embodiment, another example of actionable content comprises the search query typed by the user into a search box. Search engines such as GOOGLE and MICROSOFT have been able to monetize the search traffic exceptionally well as the search query completely captures the user intent and has high actionable intent.

In an embodiment, a social network such as LINKEDIN may use the system 100 to predict that one or more e-commerce executives may search for "conversational commerce software". This may be accomplished by using one or more inputs such as the aggregated user behavior on the social network (in case the executive may be reading articles about conversational commerce), data from visits to the websites of conversational commerce companies, location information and offline meetings, among others.

In an embodiment, the predicted search tokens may be used by one or more search engines such as GOOGLE and MICROSOFT to pre-populate the search query in the search text box and show one or more search results.

In an embodiment, the method described above may be implemented by issuing a query for the predicted interests to a horizontal search engine such as GOOGLE.com and/or BING.com. The predicted interest intents may be derived by training a behavior-to-search neural network with one or more vectors gathered from the aggregated user behavior profile and one or more observed interest intent. Additionally, the deep reinforcement learning algorithm may be used to optimize the intent predictions further by observing the engagement with one or more predicted interests and aggregated user profiles.

In an embodiment, the generation of search tokens can be monetized. One or more applications showing one or more notifications to the user regarding new deals or upcoming meetings may become more efficient and accurate by using one or more aggregated behavior vectors gathered from multiple sources. As a first step, the aggregated behavior of the user may be used to ensure that the notification is a new notification. This may be done by implementing a semantic comparison between the new notification and any notifications that the user has seen in the past. In an embodiment, the semantic comparison may be done by computing the similarity between one or more paragraph vectors of the new event and one or more other events in the aggregated user behavior profile.

In an embodiment, once the system 100 has confirmed that the notification is a new notification, the system 100 may concatenate a personal preference (expressed, for example, as a category vector) and one or more demographic group vectors to the notification to ensure that it is a good notification to display to the user. The notification may be scored to evaluate its importance to the user. In an embodiment, this may be implemented by a simple cosine similarity between the user preference vector and the notification vector. The score may be used to show notifications in one more different colors depending upon the predicted engagement. An implicit engagement between the notification and the user aggregated profile may be further optimized by a deep reinforcement learning module to further improve the quality of the notification.

In an embodiment, one or more social networking sites may use the above-described method to personalize notifications displayed to users through their website. The personalization of notifications may be used to monetize one or more services offered or displayed by the social networking website.

Monetization System for a Service Using Predicted Search Tokens

Once a user has determined their target customer base, the user may derive one or more keywords from the predicted search tokens. Further, using an application such as GOOGLE ADWORDS, the user may place a bid on short-listed keywords.

In an embodiment, the user may use an application such as GOOGLE ADWORDS to reach new customers and grow their business. The user can become an active advertiser by targeting customers across the search network and the display network. The search network refers to Pay-Per-Click (PPC) advertising, wherein advertisers bid on keywords that may be relevant for their business to have a chance to display their advertisements to customers who enter those keywords into GOOGLE as part of their search query. The display network offers advertisers the option of placing visual banner advertisements on websites that are part of the Display network.

In an embodiment, advertising merchants may use an advertisement campaign management website on a social network and choose one or more predicted search keywords to show one or more advertisements on a social network and/or website.

In an embodiment, it is to be noted, that this is unlike existing advertising systems such as AdWords, wherein advertisers are bidding on search queries that happen on the search engine such as Google.com and Bing.com. As an example, a company selling a conversational commerce software such as VOICY.AI may bid on one or more advertising slots targeting ecommerce executives on social network such as LINKEDIN; wherein the executives are predicted to use a search engine to search for keywords such as "conversational software", "conversational commerce companies", "conversational commerce startups" in the next week or month.

In an embodiment, one or more inputs comprising previous purchase history vector, user profile vector, time intervals of aggregated actions, image vectors seen on social network, social feed, search history and AMAZON ALEXA queries, among other data aggregated from one or more search engines may be used to predict the search query of one or more commerce websites including FLIPKART.com, AMAZON.com and EBAY.com, using the system 100 to generate one or more search tokens for the user.

In an embodiment, the aggregated user behavior profile may also be used to personalize the user's home page on one or more social networks and/or websites, based on the prediction of search/merchandising intent using the above methods. In an embodiment, personalization may be implemented by showing the user one or more items they may be interested in, using one or more predicted search queries.

In an embodiment, the predicted search tokens may be used to show one or more content to users on social networks and/or websites that the users may interact with. The predicted search tokens may also be used to show one or more relevant advertisements. Further, one or more advertisement slots on social networks and/or websites may be populated by auctioning them to one or more advertisers.

In an embodiment, the applications showing one or more notifications to the user regarding new deals or upcoming meetings may become more efficient and accurate by using one or more aggregated behavior vectors gathered from multiple sources. As a first step, the aggregated behavior of the user may be used to ensure that the notification is a new notification. This may be done by implementing a semantic comparison between the new notification and any notifications that the user has seen in the past. In an embodiment, the semantic comparison may be done by computing the similarity between one or more paragraph vectors of the new event and one or more other events in the aggregated user behavior profile.

In an embodiment, once the system 100 has confirmed that the notification is a new notification, the system 100 may concatenate a personal preference (expressed, for example, as a category vector) and one or more demographic group vectors to the notification to ensure that it is a good notification to display to the user. The notification may be scored to evaluate its importance to the user. In an embodiment, this may be implemented by a simple cosine similarity between the user preference vector and the notification vector. The score may be used to show notifications in one more different colors depending upon the predicted engagement. An implicit engagement between the notification and the user aggregated profile may be further optimized by a deep reinforcement learning module to further improve the quality of the notification.

Generating Hyper-Personalized Marketing Messages

In an embodiment, one or more deep learning techniques may also be used to improve actionable advertisements that are specifically targeted at the user. Merchants today are spending on video and display advertising to increase their customer base. Such merchants may make better use of their marketing budget by targeting users with one or more hyper-personalized actionable ad (advertisements which require immediate action from the user) and by targeting users who may have an anticipated need soon.

In an embodiment, the hyper-personalized marketing message may be created by using deep reinforcement learning to compute the expected value of a content article for a given state of user interaction with a website/application/system. Depending on the context of the application, the state in reinforcement learning may be a combination of the user's search history and behavioral interest. The user's behavioral actions may include one or more clicks on a content article, filling a login form and completing a purchase action, among others.

In an embodiment, as an example for a hyper-personalized marketing message, the system 100 may have collected and fed one or more inputs related to a user into the learning module. The inputs may comprise the user's social network media feed, browsing history and user impressions. Subsequently, the learning module 312 may determine that the user may be interested in eating food from their favorite restaurant, "Olive Garden", around noon. Further, the learning module may use past transactions of the user to determine their favorite dish and offer a discount of 20% on it. Consequently, the system 100 may display one or more advertisements related to "Grilled Chicken Flatbread" around noon to the user through one or more devices 102 of the user. In case the user does not click on the advertisement to pursue it, the system 100 may determine that the user is not interested in the offer for that dish. Subsequently, the system 100 may determine one or more other dishes that the user may be interested in. In case the user clicks on the advertisement, the system 100 may communicate with the point of sale system of "Olive Garden" using an Application Programming Interface (API) call or through an email which may be communicated to the merchant. The user-id of the user may be encrypted when the marketing message is sent out to ensure the privacy of the user.

In an embodiment, an example of the advertisement communicated to the user may be "You have been a valuable customer of Olive Garden. We are happy to offer you 20% discount on your favorite dish "Grilled Chicken Flatbread" You can click "yes" to place an order.". Subsequently, the user may click yes in the advertisement. Further, the user may order one or more dishes which will be communicated to the Point of Service system of the restaurant "Olive Garden".

In an embodiment, the appropriate discount for the user may be determined using a Regression algorithm trained to optimize one or more variables including revenue per marketing message and/or conversion probability on the marketing message. As an example, in an embodiment, the system 100 may determine an appropriate personalized discount for the user to complete a transaction with the merchant. As an example, a user may not be interested in a dish "Chicken Sandwich" at a 10% discount, but may be tempted to order the dish, in case a discount of 20% is offered to the customer.

In an embodiment, the predicted interests of the user may be used to display a personalized data feed on the user's device 102, after the user unlocks the device 102. This may decrease the time and effort put in by the user for typing and searching for one or more search queries.

CONCLUSION

The forgoing disclosure overcomes the drawbacks of the conventional token generation systems by using advanced wide and deep learning and reinforcement learning techniques to generate search tokens that are of interest to the user. These search tokens can be used in generating content articles, hyper-personalized marketing messages, actionable content. The disclosed system and method allows social networks, websites of interest and news websites to increase monetization from users using content and advertisement generating algorithms that can accurately process the activity of users to predict search intent. Further, the system described above may aid in sending personalized content, advertisements and merchandising recommendations including hyper personalized marketing messages from a business merchant to the user by predicting the user's next merchandising inspiration/search intent and presenting an advertisement on a social network/website before the user can use a search engine, thus getting distracted by advertisements on the search engine. Further, one or more deep learning techniques may also be used to improve actionable advertisements targeted at the user. As an example, merchants spend on video and display advertising hoping that the advertisements will bring in customers. Such merchants may derive better profit with their marketing budget by using hyper-personalized actionable advertisements that target users who will have an anticipated need in the near future. Additional advantages not listed may be understood by a person ordinary skilled in the art in view of the embodiments disclosed above.

In the foregoing detailed description, numerous specific details, examples, and scenarios are explained in order to facilitate a thorough understanding of the present disclosure. However, the embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation. Thus, the scope of the invention should be determined by the appended claims and their legal equivalents rather than by details, examples, and scenarios provided.

It shall be noted that the processes described above are described as sequence of steps; this was done solely for the sake of illustration. Accordingly, it is understood that some steps may be added, some steps may be omitted, the order of the steps may be re-arranged, or some steps may be performed simultaneously.

Although embodiments have been described with reference to specific example embodiments, it will be evident that various combinations, modifications, additions, and omissions may be made to these embodiments without departing from the broader spirit and scope of the foregoing disclosure and appended claims. Accordingly, the specification and drawings are to be regarded in an illustrative sense rather than a restrictive sense.

It is to be understood that the phraseology or terminology employed herein is for the purpose of description and not of limitation.

I claim:

1. A method for predicting search tokens for a user, the method comprising:
   receiving and storing, by a server, having one or more processors with a memory, one or more user information, from an electronic data processing device equipped with a browser to communicate with the server, in a user database;
   attempting to identify, by the server, one or more of profiles or accounts of the user on one or more digital platforms;
   if the one or more of profiles or accounts of the user on one or more digital platforms is identified, the server is configured for:
      collecting, by the server, and storing one or more information related to one or more activities of the user on the digital platforms and in external systems, in the user database; and
      building, by the server, a user profile vector to characterize the user's behavior, wherein the user profile vector is built by processing one or more word tokens derived from one or more of a social network, previous search engine queries, offline location data, meeting information, user demographic information, vectors for the images that are viewed by the user, or time associated with one or more events;
   if the one or more of profiles or accounts of the user on one or more digital platforms is unavailable, the server is configured to:
      identifying other users who are similar to the user based on the user activity; and
      building a user profile vector using one or more data based on one or more other users who are similar to the user;
   deriving, by the server, one or more search tokens by processing the user profile vector with a machine learning model, wherein the machine learning model comprises an encoder-decoder architecture guided by an attention mechanism;
   ranking, by the server, the search tokens to identify one or more content that is of interest to the user;
   determining, using the machine learning model, an item corresponding to the identified content, an optimum discount for the item and a time to recommend the item to the user;
   recommending the item to the user during the time by selecting an advertising message based on the search tokens and displaying the advertising message on a digital platform used by the user;
   determining whether the user is interested in the recommended item based on whether the user has interacted with the advertising message via a corresponding link;
   if the user is interested in the recommended item, communicate, by a communication module of the server, with one or more external systems via an API call to place an order comprising the recommended item on behalf of the user; and
   wherein the time is determined, by the one or more processors, using a regression algorithm.

2. The method according to the claim 1, wherein the digital platforms include one or more of social networks, search engines, chat history, applications or websites.

3. The method according to the claim 1, further comprising using an aggregated user profile vector in one or more collaborative filtering algorithms as an additional variable to generate one or more of similar item recommendations and user recommendations.

4. The method according to the claim 3, further comprising using the aggregated user profile vector to train one or more machine learning algorithms to identify one or more search tokens.

5. The method according to the claim 4, further comprising processing the search tokens by ranking the search tokens according to their effectiveness on the user.

6. The method according to the claim 5, wherein the ranking comprises using a deep feed forward neural network.

7. The method according to the claim 6, wherein one or more input features for the ranking comprises one or more of word embeddings of search tokens, aggregated user behavior, location of the user or demographic information of the user.

8. The method according to the claim 1, wherein the content is one or more of an actionable conversational advertising message on a communication channel inviting the user to complete an action with a business.

9. The method according to the claim 1, wherein the content can be derived from search queries typed by the user into a search box by tying the activity of the user and predicting search intent to increase monetization from users.

10. The method according to the claim 1, further providing an advertisement campaign management website by which advertisers choose derived search tokens related to advertisements to be shown on the social network or a website.

11. The method according to the claim 10, further comprising receiving bids from the advertisers on one or more advertisements to show content based on one or more search tokens that are predicted using the user profile vector.

12. A method for generating a personalized marketing message for a user, the method comprising:
    collecting, by a server, having one or more processors with a memory, and feed one or more inputs, from an electronic data processing device equipped with a browser to communicate with the server, related to the user into a machine learning model, wherein the inputs are based on one or more activities of the user on digital platforms and in external systems;
    deriving, by the server, one or more search tokens by processing the inputs with the machine learning model, wherein the machine learning model comprises an encoder-decoder architecture guided by an attention mechanism,
    determining, by the server, using the machine learning model, an item, an optimum discount for the item and a time to recommend the item to the user;
    recommending the item to the user during the time by selecting the personalized marketing message based on the search tokens and displaying the marketing message on a digital platform used by the user;
    determining, by the server, whether the user is interested in the recommended item based on whether the user has interacted with the marketing message via a corresponding link;
    communicating, by a communication module of the server, with one or more external systems via an API call to place an order comprising the item on behalf of the user; and
    wherein the time is determined, by the one or more processors, using a regression algorithm.

13. A method for generating a personalized advertisement for a user, the method comprising:
    collecting, by a server, having one or more processors with a memory, one or more training data, from an electronic data processing device equipped with a browser to communicate with the server, related to a user, wherein the training data is based on one or more activities of the user on the digital platforms and in external systems;
    feeding, by the one or more processors, the training data into a machine learning model comprising one or more neural network learning systems to predict one or more search tokens, wherein the machine learning model comprises an encoder-decoder architecture guided by an attention mechanism, and wherein the one or more search tokens comprise topics that are of interest to the user;
    enabling, by the electronic data processing device, an advertiser to place a bid on one or more predicted search tokens:
    displaying, by the electronic data processing device, the advertiser's advertisement to one or more users pertaining to the predicted search tokens that are bid on by the advertiser;
    identifying, by the one or more processors, other users who are similar to the user based on the user activity;
    building, by the server, an aggregated user profile using one or more data based on one or more other users who are similar to the user;
    using, by the one or more processors, the aggregated user profile to augment one or more deep reinforcement learning algorithms;
    using, by the one or more processors, one or more outputs of the one or more deep reinforcement learning algorithms to determine one or more items that may be of interest to the user;
    determining, by the one or more processors, a time using a regression algorithm;
    recommending the one or more items to the user during the time by selecting a personalized marketing message based on the search tokens and displaying the marketing message on a digital platform used by the user;
    determining, by the one or more processors, whether the user is interested in the recommended item based on whether the user has interacted with the marketing message via a corresponding link; and
    if the user is interested in the recommended item, communicating, by a communication module of the server, with one or more external systems via an API call to place an order comprising the recommended item on behalf of the user.

14. The method of claim 12, wherein the optimum discount is determined using a regression algorithm trained to optimize one or more variables.

15. The method of claim 14, wherein the one or more variables comprise revenue per marketing message.

16. The method of claim 14, wherein the one or more variables comprise conversion probability on a marketing message.

17. The method of claim 1, wherein the search tokens are used by a search engine to pre-populate the search query in the search text body and show one or more search results.

18. The method according to claim 1, wherein the encoder-decoder architecture comprises:
    an encoder LSTM cell configured to process the user profile vector as an input sequence to generate an encoded vector, wherein the encoder LSTM cell applies the attention mechanism to identify relevant portions of the input sequence based on behavior data and newly-crawled data; and a decoder LSTM cell configured to generate the search tokens based on the encoded vector, wherein the decoder LSTM applies the attention mechanism to focus on the relevant portions of the encoded vector during the generation of the search tokens.

\* \* \* \* \*